United States Patent [19]

Sprague

[11] 4,421,387
[45] Dec. 20, 1983

[54] EXTENDED THIN FILM LIGHT MODULATOR/SCANNER

[75] Inventor: Robert A. Sprague, Saratoga, Calif.

[73] Assignee: Xerox Corporation, Stamford, Conn.

[21] Appl. No.: 224,243

[22] Filed: Jan. 12, 1981

[51] Int. Cl.³ .............................................. G02F 1/03
[52] U.S. Cl. .................................. 350/356; 350/358; 350/96.14
[58] Field of Search ...................... 350/356, 358, 96.14

[56] References Cited

U.S. PATENT DOCUMENTS

| | | | |
|---|---|---|---|
| 3,810,688 | 5/1974 | Ballman et al. | 350/96.14 |
| 3,877,781 | 4/1975 | Kaminow | 350/96.14 |
| 3,877,782 | 4/1975 | Kaminow | 350/96.14 |
| 3,990,775 | 11/1976 | Kaminow et al. | 350/96.14 |
| 4,054,362 | 10/1977 | Baues | 350/96.14 |
| 4,106,848 | 8/1978 | Conwell et al. | 350/96.14 |
| 4,111,523 | 9/1978 | Kaminow et al. | 350/96.14 |

OTHER PUBLICATIONS

"Gorrelator Based on an Integrated Optical Spatial Light Modulator" by Verber et al., *App. Optics.*, vol. 20, No. 9; May 1, 1981.

*Primary Examiner*—William L. Sikes
*Assistant Examiner*—Léon Scott, Jr.
*Attorney, Agent, or Firm*—Franklyn C. Weiss

[57] ABSTRACT

A thin film light modulator (50) for use in an electro-optic line printer (11). A light valve utilizes a thin electro-optic film (54) on a substrate (52) with the index of refraction of the film being higher than the substrate so that the light can be guided in it. A laser beam (48) is caused to be guided in the film, the beam expanding sideways so that a sheet of collimated light is provided. This light is guided beneath an array of electrodes (58), consisting of an extended set of individually addressed metal fingers (60a, 60n)–(62a, 62n). The light diffracted by the electrode set is reimaged onto the recording medium (14), with the zero order diffracted light blocked out, so that each electrode pair acts as a light modulator for one picture element on the output. Alternatively, the zero order is reimaged and the higher order diffraction components are blocked out. By applying each bit of a serial stream of data to the corresponding electrode, a line recording is achieved.

7 Claims, 3 Drawing Figures

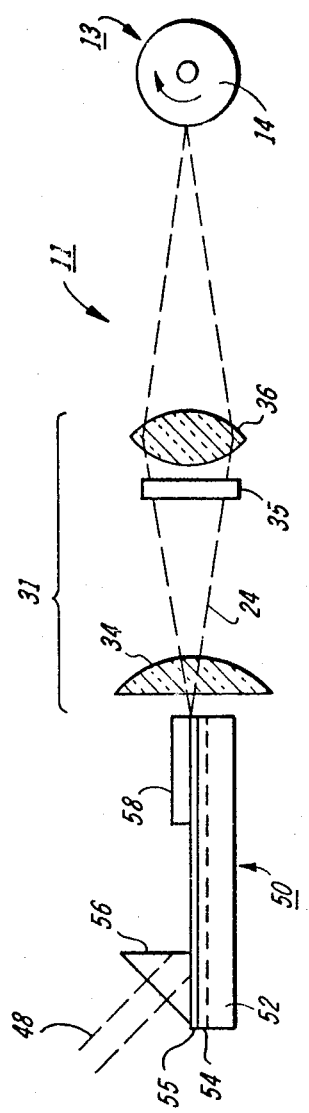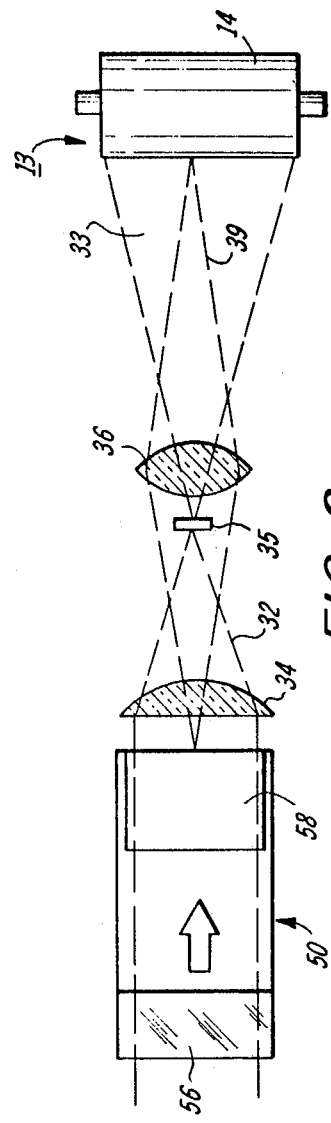

EXTENDED THIN FILM LIGHT MODULATOR/SCANNER

An extended thin film light modulator for use in line printers, and more particularly, to electro-optic line printers.

The invention relates to an extended thin film light modulator for use in providing a spatially modulated line of light to a photosensitive recording surface for subsequent development and use.

BACKGROUND OF THE INVENTION

It has been shown that an electro-optic element having a plurality of individually addressable electrodes can be used as a multigate light valve for line printing. See, for example, a co-pending and commonly assigned U.S. patent application of R. A. Sprague et al, which was filed June. 21, 1979 under Ser. No. 040,607 on a "TIR Electro-Optic Modulator With Individually Addressed Electrodes". Also see "Light gates Give Data Recorder Improved Hardcopy Resolution", *Electronic Design*, July 19, 1979, Pages 31-32; "Polarizing Filters Plot Analog Waveforms", *Machine Design*, Volume 51, Number 17, July 26, 1979, Page 62; and "Data Recorder Eliminates Problem of Linearity", *Design News*, Feb. 4, 1980, Pages 56-37.

The same inventor in a co-pending and commonly assigned U.S. patent application of R. A. Sprague, Ser. No. 187911, filed Sept. 17, 1980, now U.S. Pat. No. 4,389,659 on "Electro-Optic Line Printer" disclosed the support optics and electronics for incorporating a multigate light valve into a line printer. The present invention is an extension of the invention set forth in Ser. No. 187911, filed Sept. 17, 1980, now U.S. Pat. No. 4,389,659, and the specification and drawings thereof are herein incorporated by reference.

In co-pending application Ser. No. 187911, filed Sept. 17, 1980, now U.S. Pat. No. 4,389,659 it is disclosed that almost any optically transparent electro-optic material can be used as the electro-optic element of such a light valve as disclosed herein. Presently, the most promising materials appear to be $LiNbO_3$ and $LiTaO_3$, but there are other materials which qualify for consideration, including BSN, KDP, $Ba_2NaNb_5O_{15}$ and PLZT. In any event, the electrodes of such a light valve are intimately coupled to the electro-optic element and are distributed in non-overlapping relationship widthwise of the electro-optic element (i.e. orthogonally relative to its optical axis), typically on equidistantly separated centers so that there is a generally uniform interelectrode gap spacing.

To perform line printing with a multi-gate light valve of the foregoing type, a photosensitive recording medium such as a xerographic photoreceptor is exposed in an image configuration as it advances in a cross line direction (i.e., a line pitch direction) relative to the light valve. More particularly, to carry out the exposure process, a sheetlike collimated light beam is transmitted through the electro-optic element of the light valve, either along its optical axis for straight through transmission or at a slight angle relative to that axis for total internal reflection (TIR). Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (that is, a light beam illuminated region of the electro-optic element which is subject to being penetrated by the electric fields). Thus, the phase front or polarization of the light beam is modulated in accordance with the data samples applied to the electrodes as the light beam passes through the interaction region.

The present invention relates to a thin film light modulator for use in such an electro-optic line printer. According to the present invention, the light valve utilizes a thin electro-optic film on a substrate, with the index of refraction of the film being higher than the substrate so that the light can be guided in it. A laser beam is caused to be guided in the film through one of the many ways noted in the literature. This beam is expanded sideways either before or after coupling into the film so that a sheet of collimated light is provided. This light is guided beneath an array of electrodes identical to the array described in co-pending application Ser. No. 187,911, filed Sept. 17, 1980, now U.S. Pat. No. 4,389,659, as herein incorporated by reference, which consists of an extended set of individually addressed metal fingers. As set forth in said co-pending application, the light diffracted by this electrode set is reimaged onto the recording medium, with the zero order diffracted light blocked out, so that each electrode acts as a light modulator for one picture element on the output. Alternatively, the zero order is reimaged and diffracted light blocked out. By applying each bit of a serial stream of data to each electrode after serial to parallel conversion, a line recording of the data is achieved.

DESCRIPTION OF THE DRAWINGS

For a more complete understanding of the invention, reference may be had to the following detailed description of the invention in conjunction with the drawings wherein:

FIG. 1 is a schematic side view of a straight through electro-optic line printer constructed in accordance with the present invention;

FIG. 2 is a schematic top plan view of the electro-optic line printer shown in FIG. 1.

DETAILED DESCRIPTION OF THE INVENTION

Figure 3:
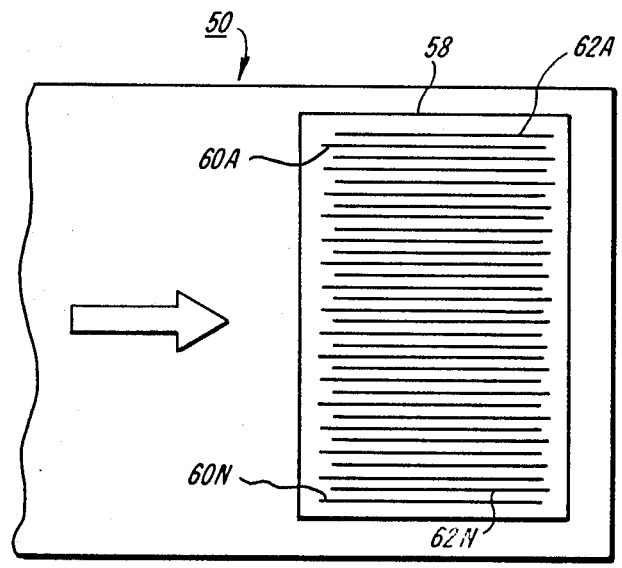
FIG. 3 is an enlarged partially cutaway plan view of the light valve of the line printer of FIGS. 1 and 2.

FIGS. 1 and 2 disclose an electro-optic line printer 11 comprising light valve 50 for exposing a photosensitive recording medium 13 in an image configuration. The recording medium 13 is depicted as being a photoconductively coated xerographic drum 14 which is rotated (by means not shown) in the direction of the arrow. It will be evident, however, that there are other xerographic and non-xerographic recording media that could be used, including photoconductively coated xerographic belts and plates, as well as photosensitive film and coated paper which may be supplied as web or cut sheet stock. The recording medium 13 should, therefore, be visualized in the generalized case as being a photosensitive medium which is exposed in an image configuration while advancing in a cross line or line pitch direction relative to the light valve 50. The light valve disclosed in said co-pending application Ser. No. 187,911, filed Sept. 17, 1980, now U.S. Pat. No. 4,389,659, as hereinabove set forth, operates in a TIR (Total Internal Reflective) mode. The present application includes a light valve 50 wherein the electro-optic interaction is not in the TIR mode, but with a light guided in thin film 54. The basic valve 50 utilizes a thin electro-optic layer on a substrate 52, with the index of refraction of the film being higher than the substrate so that light can be guided in film 54. Substrate 52 could comprise lithium niobate with titanium in-diffused or lithium oxide out-diffused. Dotted line 57 represents the rough boundary of said diffusion layer. The solid line 55 upper level of film 54 could comprise an insulating layer of silicon dioxide to avoid spurious amplitude and phase modulation of the light. A laser beam 48 is caused to be guided in the film by means of any one of many prior art techniques such as by coupling to the thin film 54 by prism 56, or it could be by the techniques of grating coupling, butt coupling, or film integration with a diode laser. Beam 48 is expanded sideways either before or after coupling into the film so that a sheet of collimated light is provided. This light 48 is guided beneath an array of individually addressable electrodes (60a, 60n), and groundplane electrodes (62a, 62n) which is identical to the array set forth in the aforementioned co-pending application Ser. No. 187,911, filed Sept. 17, 1980, now U.S. Pat. No. 4,389,659. As in the TIR multi-gate light valve, the light diffracted by this electrode set is reimaged onto the recording medium 13 with the zero order diffracted light blocked out by the the zero order stop 35, so that each pair of electroddes (60a, 60n)-(62a, 62n) acts as a light modulator for one picture element on each line of the output printed image. As an alternative, the zero order diffracted light could be reimaged and the diffracted light blocked out. By sequentially applying the bits of a serial stream of data to each corresponding electrode, as set forth in said co-pending application, a line recording can be achieved.

In operation, a sheet-like collimated beam of light 48 from a suitable source, such as a laser (not shown), is transmitted through prism 56 onto the thin film 54 of the valve 50. The light travels through this thin film beneath the drive electrodes 58 and illuminates substantially the full width of the thin film at the location of the electrode. The light beam 48 is modulated while passing underneath the drive electrodes with the data samples applied to the electrode pairs (60a, 60n)-62a, 62n).

More particularly, to modulate the light beam 48, successive sets of digital or analog data samples, which represent respective collections of picture elements for successive lines of the image, are sequentially applied to the electrode pairs (60a, 60n)-(62a, 62n). Activation of the electrodes selectively changes the refractive index of the thin film substrate 54, causing a predetermined diffraction effect which modulates the light beam 24. Consequently, the phase front of the light beam 24 is serially and spatially modulated in accordance with the data samples for successive lines of the image as the light beam 24 passes through the region directly below the electrode structure 58 of the electro-optic element 50.

To expose the recording medium 13 in an image configuration, there suitably are Schlieren central dark field imaging optics 31 which are optically aligned between the electro-optic valve 50 and the recording medium 13 for imaging the light beam 24 onto the recording medium 13. The imaging optics 31 convert the spatial phase front modulation into a correspondingly modulated intensity profile and provide any magnification that is required to obtain an image of a desired width. To accomplish that, the illustrated imaging optics 31 include a field lens 34 for focusing the zero order diffraction components 32 of the phase front modulated light beam 24 onto a central stop 35 and an imaging lens 36 for collecting the scattered higher order diffraction components onto the light valve image plane defined by the recording medium 13. The field lens 34 is optically aligned between the electro-optic element 50 and the stop 35 so that substantially all of the zero order components 32 of the light beam 24 are blocked by the stop 35. The higher order diffraction components of the light beam 24 scatter around the stop 35 and are collected by the imaging lens 36 which, in turn, focusses them onto the recording medium 13. Of course, other readout optics could be used to convert the phase front or polarization modulated light beam provided by the electro-optic element 50 into a light beam having a correspondingly modulated intensity profile as both set forth, for example, in said co-pending application and in this application. As indicated in FIG. 2 by lines 39, each pair of electrodes (60a, 60n)-(62a, 62n) cooperates with the electro-optic element 50 and the phase modulated sensitive readout optics 36 to effectively define a local modulator for creating a picture element at a unique, spatially predetermined position along each line of the image. Accordingly, the number of electrode pairs (60a, 60n)-(62a, 62n) determines the number of picture elements that can be printed on each line of the image. By sequentially applying successive sets of data samples to these local modulators while the recording medium 13 is advancing in a cross line direction relative to the light valve 50, successive lines of the image are printed.

The drive electronics for the invention set forth herein are the same as that set forth above in the said co-pending application and need not be fully set forth herein as said application is hereby incorporated by reference. If LSI (Large Scale Integration) technology is used for fabrication of the light valve 50, the coupling between the silicon driver electronics and the electrode pattern is solved as set forth in a commonly assigned application to William D. Turner on "Proximity Coupled Electro-Optic Devices", Ser. No. 187,935, filed Sept. 17, 1980, now U.S. Pat. No. 4,383,962. In the most likely device design, said coupling is achieved with the electrodes fabricated on the silicon chip 58 and pressed against the top of thin film 54 as shown in FIG. 1, so that the fringing field of the electrodes (60a, 60n)-(62a, 62n) is coupled into the thin film 54. If necessary, as set forth in said co-pending application, the film 54 could be overcoated with a thin dielectric layer 55 to prevent unwanted spurious modulation of the light beam 24. Further, instead of external electronics, an alternate choice for said drive electronics could use thin film transducer technology to build the electronics directly on the integrated optics substrate.

As another alternative, a thin film multi-gate light valve could be fabricated by magnetron sputtering of a thin film electro-optic over-coating of, for example, zinc oxide (ZnO) onto a silicon dioxide (SiO$_2$) outer layer of an electrode bearing LSI driver and/or onto an electrode (gold, copper, titanium, or tungsten) metallization layer of such a driver.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In an electro-optic line printer (11) having a multi-gate light valve (50) for phase front or polarization modulating a sheet like, collimated light beam (48) in accordance with input data samples of finite duration representing individual picture elements of an image, and phase or polarization sensitive optics (31) for imaging the modulated light beam onto a photosensitive recording medium (14) as said recording medium advances in a cross line direction relative to said light valve, whereby said recording medium is exposed in an image configuration, wherein the improvement is characterized by:

said light valve (50) comprising a substrate (52) containing an optically transmissive electro-optic film (54), drive electrodes (60, 62) in the form of a plurality of individually addressable electrodes formed on said electro-optic film (54) such that when said light beam is guided by said optically transmissive electro-optic element, said light completely passes under said drive electrodes, said individually addressable electrodes creating electric fringe fields within said electrooptic element to phase front or polarization modulate said light beam.

2. The electro-optic line printer of claim 1 further including means (56) for guiding the input light beam into said film.

3. The electro-optic line printer of claim 1 wherein said means for guiding the light into said film comprises a prism (56), one face of which is in intimate relationship with said optically transmissive electro-optic film (54) such that the input light beam is bent and introduced into said film in a sheet-like configuration.

4. The electro-optic line printer of claim 3 wherein said individually addressable electrodes (60) are paired with respective ground plane electrodes (62), and
said ground plate electrodes being intimately coupled to and distributed across said electro-optic film in alternating paired relationship with said individually addressable electrodes.

5. The electro-optic line printer of claim 4 wherein said individually addressable electrodes are intimately coupled to said electro-optic element adjacent said reflecting surface for creating electric fringe fields within an interaction region of said electro-optic element (54), whereby the phase front of said light beam is modulated in accordance with the data samples applied to said electrodes as said light beam passes through said interactive region.

6. The electro-optic line printer of claim 5 wherein the light diffracted by said individually addressable electrodes is imaged onto said recording medium with the zero order diffracted light blocked out such that each electrode pair acts as a light modulator for one picture element.

7. The electro-optic line printer of claim 5 wherein the light diffracted by said individually addressable electrodes is imaged onto said recording medium with the higher order diffraction components of the light blocked out such that each electrode pair acts as a light modulator for one picture element.

* * * * *